WILLIAM JONES KENT, OF DETROIT, MICHIGAN, ASSIGNOR TO HIMSELF AND LYMAN W. CARR, OF SAME PLACE.

Letters Patent No. 86,414, dated February 2, 1869.

IMPROVED COMPOUND FOR SOLDERING.

Schedule referred to in these Letters Patent and making part of the same.

*To whom it may concern:*

Be it known that I, WILLIAM JONES KENT, of Detroit, in the county of Wayne, and State of Michigan, have invented a new and useful Improvement in Soldering Tin-Ware; and I do declare that the following is a true and accurate description thereof.

The object of this invention is to so simplify the art of soldering tin or brass, that it may be done in families, to repair tin or brass-ware, without the intervention of a tinsmith with his iron or fire.

In order to accomplish this end, I scrape the part to be repaired, and wet it with a chemical solution, especially prepared for the purpose, in the following manner:

I dissolve a proper amount of zinc in pure cider vinegar, or so much as said vinegar will hold in solution. Then I add a suitable quantity of muriate of ammonia, distilled in the whey of milk, by means of which a chemical compound is secured which forms a flux, by means of which, and solder, any known metals can be soldered, and will entirely do away with the necessity of brazing, as it mends perfectly and securely any kind of the known metals. Then place it over a blaze of fire and sprinkle a little of Kent's family solder, and as soon as melted, withdraw it from the blaze, and the repairing is complete.

What I claim as my invention, and desire to secure by Letters Patent, is—

The chemical compound, prepared substantially as and for the purposes herein specified.

WILLIAM JONES KENT.

Witnesses:
    H. F. EVERTS,
    LOUIS C. HYDE.